No. 879,263. PATENTED FEB. 18, 1908.
J. HEISSENBERGER.
SELF MEASURING TANK.
APPLICATION FILED APR. 19, 1907.
2 SHEETS—SHEET 1.
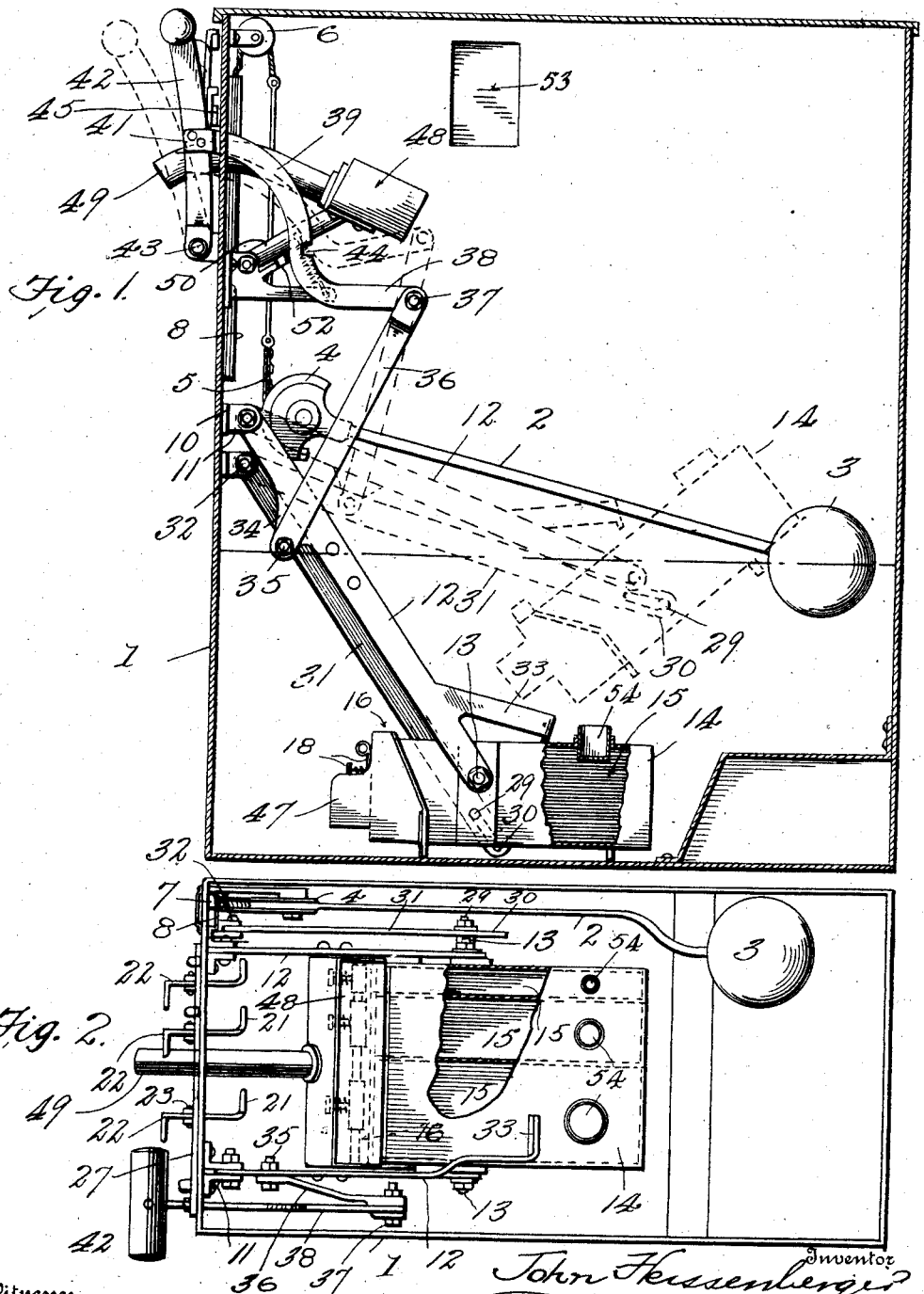

No. 879,263. PATENTED FEB. 18, 1908.
J. HEISSENBERGER.
SELF MEASURING TANK.
APPLICATION FILED APR. 19, 1907.
2 SHEETS—SHEET 2.
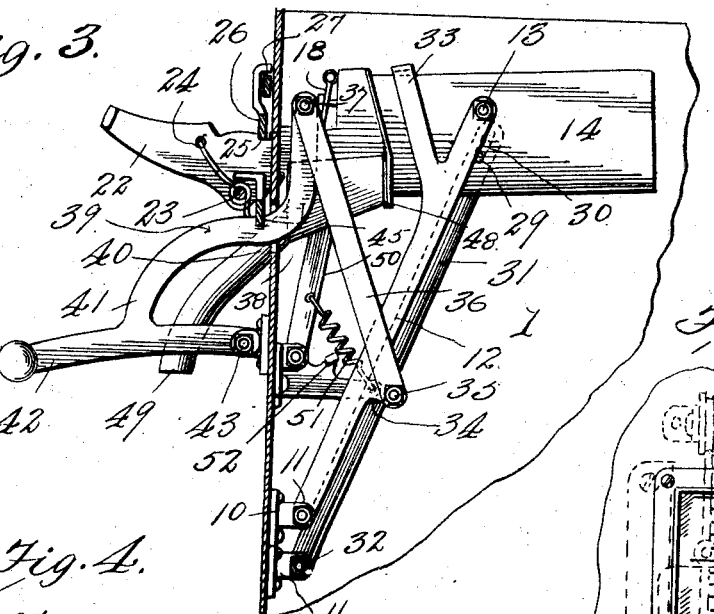
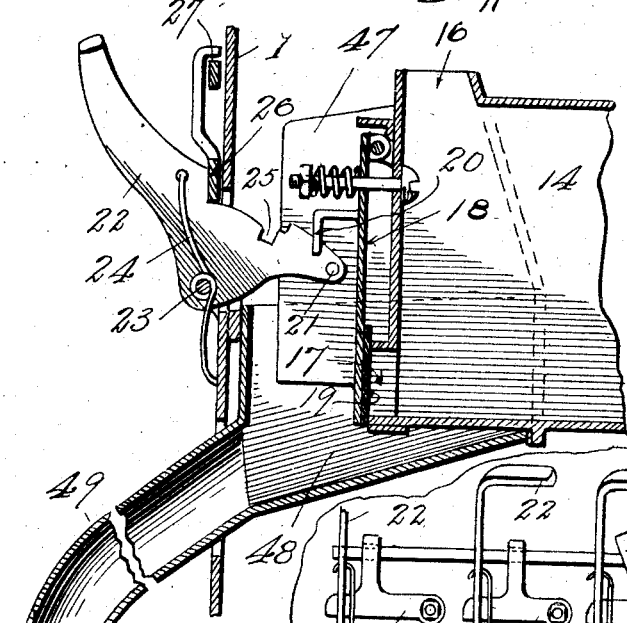

UNITED STATES PATENT OFFICE.

JOHN HEISSENBERGER, OF NEW YORK, N. Y., ASSIGNOR TO AUTOMATIC UTILITIES COMPANY, OF NEW YORK, N. Y., A CORPORATION OF NEW YORK.

SELF-MEASURING TANK.

No. 879,263.  Specification of Letters Patent.  Patented Feb. 18, 1908.

Application filed April 19, 1907. Serial No. 369,155.

*To all whom it may concern:*

Be it known that I, JOHN HEISSENBERGER, a citizen of the United States, residing at New York, in the county of New York and State of New York, have invented certain new and useful Improvements in Self-Measuring Tanks, of which the following is a specification.

My invention relates to improvements in self or automatic measuring tanks, such as are particularly adapted for measuring oil or other liquids.

One object of my invention is the provision of a measuring tank which will automatically measure the liquid and will discharge any quantity desired.

Another object of my invention is the provision of an automatic measuring tank which will accurately measure and supply the desired quantity of oil or liquid and which will designate the amount of oil at all times in the tank.

Another object of my invention is the provision of a self or automatic measuring tank which will be easy to operate and absolutely accurate; which will be of the simplest and most durable construction and inexpensive and practical in every particular.

With these objects in view my invention consists broadly of a tank, automatic means for measuring the liquid and means for designating and discharging the desired amount of liquid.

The invention also consists of a self or automatic measuring tank embodying novel features of construction and combination of parts substantially as disclosed herein.

In order that the detailed construction of my tank and its operation be fully understood and the many features of merit be fully appreciated, I invite attention to the accompanying drawings in which an embodiment of my improvements is shown.

Figure 1, represents a side elevation of the tank with one wall removed to clearly show interior mechanism, the parts being in their normal or initial position and certain parts of the device being broken away. Fig. 2, is a top plan view of the same with parts cut away. Fig. 3, is a fragmentary view of Fig. 1, the parts being in the position assumed when discharging a determined quantity of liquid. Fig. 4, is an enlarged sectional view of Fig. 3. Fig. 5, represents an enlarged front end view of the upper portion of the tank. Fig. 6, is a broken detail view of the indicator for showing the amount of liquid in the tank.

In the drawings: The numeral 1, designates the tank or containing vessel preferably made of sheet metal and of any size or capacity desired and of any preferred shape which is provided with filling apertures 53. On one side of the tank is pivoted the lever 2, having at one end the float 3, and at its other end carrying the grooved segment wheel 4, to which is connected the lower end of a chain 5, which passes up and over a guide pulley 6 and is connected at its other end to the plate 7, moving in guides 8, and serving to designate on the scale 9, the amount of oil in the tank, as is evident.

On the inner side of the front wall of the tank, is secured a bracket 10, having a pair of ears 11, to which are pivoted the inner ends of the pair of links 12, the other or outer end of said links being pivoted to the pins or studs 13, carried by the measuring receptacle 14, which receptacle is divided into a series of compartments 15, being of a size to measure designated and desired quantities of liquid. The measuring receptacle is closed except for the inlets 16, which allow the entrance of liquid to fill the receptacle and the front wall of the receptacle is provided with a series of discharge openings 17, which are normally closed liquid-tight by means of the spring flaps 18, having the closures or stoppers 19. The flap valves are further provided with lips 20, adapted to be engaged by the studs 21, on the series of levers 22, pivoted in the wall of the tank at 23, and having returning springs 24, which serve to keep the levers in their normal or proper position. The levers are also provided with kerfs or recesses 25, with which engage the pawls or keepers 26, connected to the single bar 27, pivoted at 28. Each of the compartments of the measuring vessel may be provided with a plug 54, for adjusting the capacity of the compartment.

The pins 13 on the measuring receptacle are arranged forward of the center, and to one side of the receptacle is secured a pin or stud 29, to which is connected the lower slotted end 30, of the guiding link or rod 31, the other end of which is connected at 32, to the ear 11, of the bracket 10, and this rod serves to guide the receptacle and insures its remaining when raised always in a horizontal plane. Connected to one of the links is the angle plate 33, which also prevents improper movement or tipping of the measuring receptacle.

To one of the links is secured the bracket 34, to which is pivoted at 35, the lower end of the bar 36, whose upper end is pivoted at 37, to the outer end of the arm 38, carried by the segmental or curved lever 39, which passes through an opening 40, in the tank and has its outer end 41, secured to the hand lever 42 fulcrumed at its lower end to the bracket 43. The curved lever is provided with a kerf 44, with which is adapted to be engaged the pivoted pawl or latch 45, which is connected with the bar 27, by means of the connection 46, the purpose of which is to prevent the hand lever connected with the measuring receptacle, from falling.

From the description and drawings, the operation of my measuring tank will be readily understood, and assuming the parts to be in normal position with the measuring receptacle submerged, by pulling down on the hand lever, the measuring receptacle is raised and retained in a horizontal position and when the hand lever is depressed and latched in depressed position, the measuring receptacle moves forward and the extensions 47, on the forward end thereof contact with the delivering scoop 48, pushing the scoop forward and carrying the discharge spout 49, to position for discharge, the parts being locked in this position by means of the latch engaging the curved lever. It is then only necessary in order to obtain the amount of oil or liquid desired to operate the desired lever which acts upon the proper valve and uncovers the desired opening when the liquid flows from the same measuring compartment of the measuring receptacle and discharges into the scoop and from thence to the spout. To return the scoop to normal or depressed position, I provide the pivoted lever 50, to which is connected the returning spring 51, and also a stop or abutment 52, is provided to limit the movement of the scoop.

It will be observed that the measuring receptacle is mounted or pivoted forward of the center in the carrier and is provided with inlets in the forward portion and that when lowered, and submerged in the liquid, the vessel or receptacle tilts and permits the filling of the receptacle and when filled, the receptacle tilts back to a horizontal position and is carried in a horizontal plane to the position of discharge. Also it will be noted that the receptacle is prevented from turning over by means of the stop or abutment as is evident.

It is evident that I provide a self or automatic measuring tank which will accurately measure and supply any desired quantity; which cannot possibly get out of order, which can be produced at a reasonable price, and which is practical in every particular.

I claim:

1. In an automatic measuring tank, the combination with a tank, a measuring receptacle adapted to be raised and lowered in said tank, means for raising and lowering the measuring receptacle, a discharge scoop adapted to be engaged by the receptacle and brought into position for discharging, and means for discharging the desired quantity from the measuring receptacle into the discharge scoop.

2. In an automatic or self measuring tank, the combination with a supply tank, a measuring receptacle divided into compartments for containing various quantities of liquid, a discharge scoop having means for discharging the desired amount of liquid from the compartments of the receptacle, and means for bringing the measuring vessel into position for discharging.

3. In an automatic or self measuring tank, the combination with a tank, a swinging measuring receptacle mounted therein, a discharge mechanism normally held out of discharge position adapted to be brought into position for discharge by engagement with the measuring receptacle, a series of compartments in the measuring receptacle provided each with an outlet, spring controlled valves for said outlets, and hand operated levers for acting upon the desired valve to discharge the liquid from the proper compartment of the receptacle.

4. In combination with a supply tank, a pivoted scoop normally held out of discharge position carrying a discharge spout, and a measuring receptacle adapted to contact the scoop and bring the scoop into discharging position.

5. In combination with a supply tank, a pivoted scoop normally held out of discharge position having a discharge spout, a measuring receptacle adapted to engage the scoop and bring the spout into discharging position, and means for returning the scoop to normal position.

6. In combination with a supply tank, a discharge scoop having a spout, a measuring receptacle having compartments for containing various quantities, means for bringing the vessel into discharge position and means for discharging the desired quantity.

7. The combination with a supply tank, a measuring vessel normally resting on the bottom of said tank and divided into compartments for various quantities, valved closures for said compartments, means for raising and lowering the measuring vessel, a dischrage scoop with spout for discharging the contents of the several compartments, and means for operating the desired valve.

8. In combination with a supply tank, a carrier, a measuring vessel pivoted in said carrier to tilt and fill, and mechanism coöperating with the carrier for carrying the vessel when filled, in a horizontal position and means for discharging the contents thereof.

9. In combination with a supply tank, a pivoted scoop carrying a discharge spout, a carrier having a vertical swinging movement, a measuring vessel having an inlet and mounted in the carrier, the carrier serving as means for guiding the measuring vessel into engagement with the scoop for discharging its contents to the scoop.

10. In combination with a supply tank, a discharge spout normally out of discharge position, a scoop connected with the spout, a carrier having mounted therein a measuring receptacle adapted to engage the scoop, said measuring receptacle normally resting on the floor of the tank but adapted when raised to discharge its contents into said scoop, valves for regulating the discharge from the receptacle, and means for returning the scoop to normal position, said carrier serving to return the measuring receptacle to normal position.

11. In combination with a supply tank, a carrier, a measuring receptacle mounted in the carrier provided with measuring compartments having valved outlets, means coöperating with the carrier for bringing the receptacle into position for discharging, means for securing the receptacle until entirely discharged and for holding open the valve to the desired compartment until entirely discharged.

12. The combination with a containing vessel, of a measuring receptacle mounted to be raised and lowered therein and provided with measuring compartments, and a discharge scoop adapted to be engaged by and to receive the contents of the measuring receptacle.

13. The combination with a containing vessel, of a measuring receptacle mounted to be raised and lowered therein and provided with measuring compartments, a discharge scoop adapted to be engaged by and to receive the contents of the measuring receptacle, and means for causing selective discharge of any one or all of the compartments of the measuring receptacle.

14. The combination with a tank, of a carrier, a measuring receptacle provided with a plurality of compartments of different capacity mounted in said carrier, each compartment being provided with an opening for filling and a valved opening for the discharge of its contents, said receptacle adapted to be raised and lowered by the carrier.

In testimony whereof I affix my signature in presence of two witnesses.

JOHN HEISSENBERGER.

Witnesses:
WM. N. MOORE,
CAROLINE OSBORN.